United States Patent [19]

Taylor et al.

[11] Patent Number: 4,638,895
[45] Date of Patent: Jan. 27, 1987

[54] FRICTIONLESS HYDRAULIC DAMPER AND DAMPER-SNUBBER

[75] Inventors: Douglas P. Taylor, N. Tonawanda, N.Y.; David A. Lee, Santa Monica, Calif.

[73] Assignee: Tayco Developments, Inc., North Tonawanda, N.Y.

[21] Appl. No.: 752,094

[22] Filed: Jul. 5, 1985

[51] Int. Cl.⁴ .......................... F16F 9/49; F16M 13/00
[52] U.S. Cl. ..................................... 188/280; 188/282; 188/322.17; 188/312; 248/562; 267/134
[58] Field of Search ............... 188/266, 268, 272, 279, 188/280, 282, 311, 312, 313, 314, 318, 322.11, 322.16, 322.17, 322.22, 381, 134, 298, 317; 267/113, 134, 140.1; 277/53; 248/562, 636; 74/89.12; 92/34, 37

[56] References Cited

U.S. PATENT DOCUMENTS

| | | | |
|---|---|---|---|
| 2,252,772 | 8/1941 | Katcher | 188/280 |
| 2,310,570 | 2/1943 | Briggs | 188/280 |
| 2,936,860 | 5/1960 | Peras | 188/312 X |
| 2,953,810 | 9/1960 | Hall | 188/317 |
| 3,412,827 | 11/1968 | Brooks | 188/282 |
| 4,280,600 | 7/1981 | Salmon et al. | 188/312 |

Primary Examiner—Bruce H. Stoner, Jr.
Assistant Examiner—Robert J. Oberleitner
Attorney, Agent, or Firm—Joseph P. Gastel

[57] ABSTRACT

A frictionless hydraulic damper including a cylinder having end walls mounting the opposite ends of a shaft with a clearance in labyrinth seals, bellows seals between each end wall and the portions of the shaft extending beyond each end wall, a piston head on the shaft within the cylinder, hydraulic fluid in the cylinder and in both bellows seals, an orifice construction located relative to the piston head for permitting flow of hydraulic fluid past the piston head to produce damping, and a conduit in the shaft for effecting communication between the two bellows. The damper as described above also functions as a snubber by including a valve construction which selectively closes the orifice construction.

13 Claims, 5 Drawing Figures

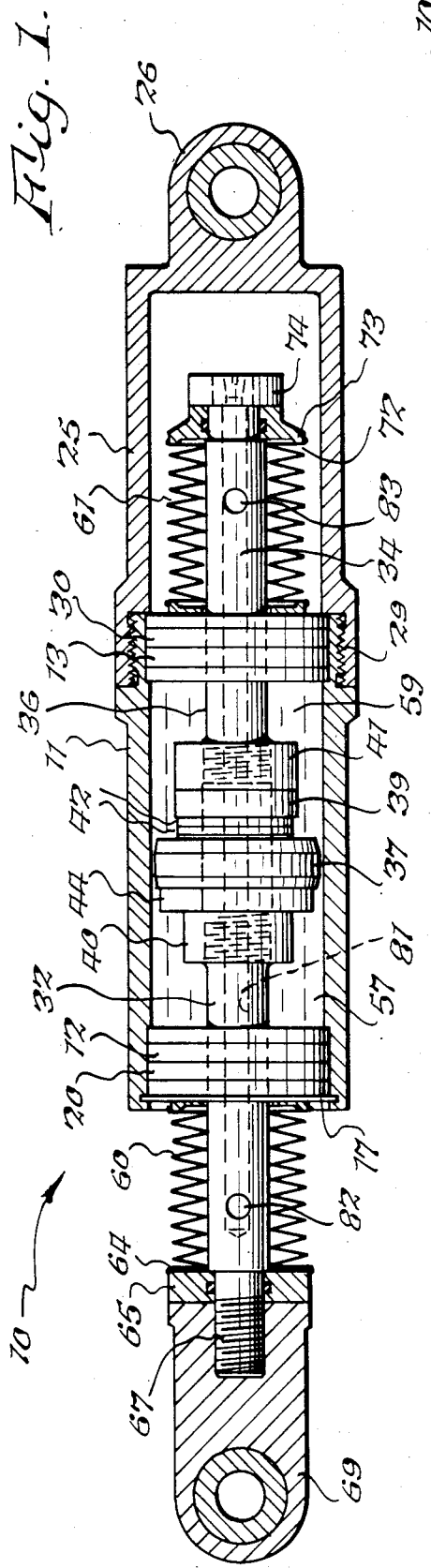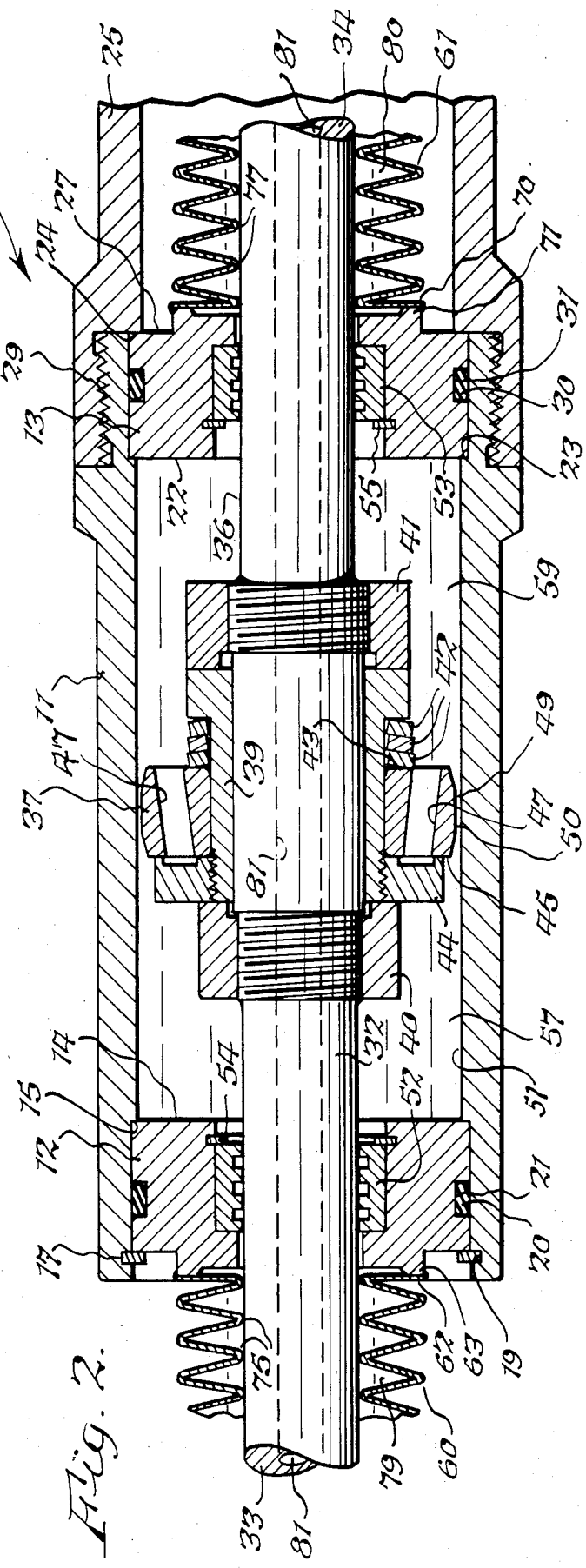

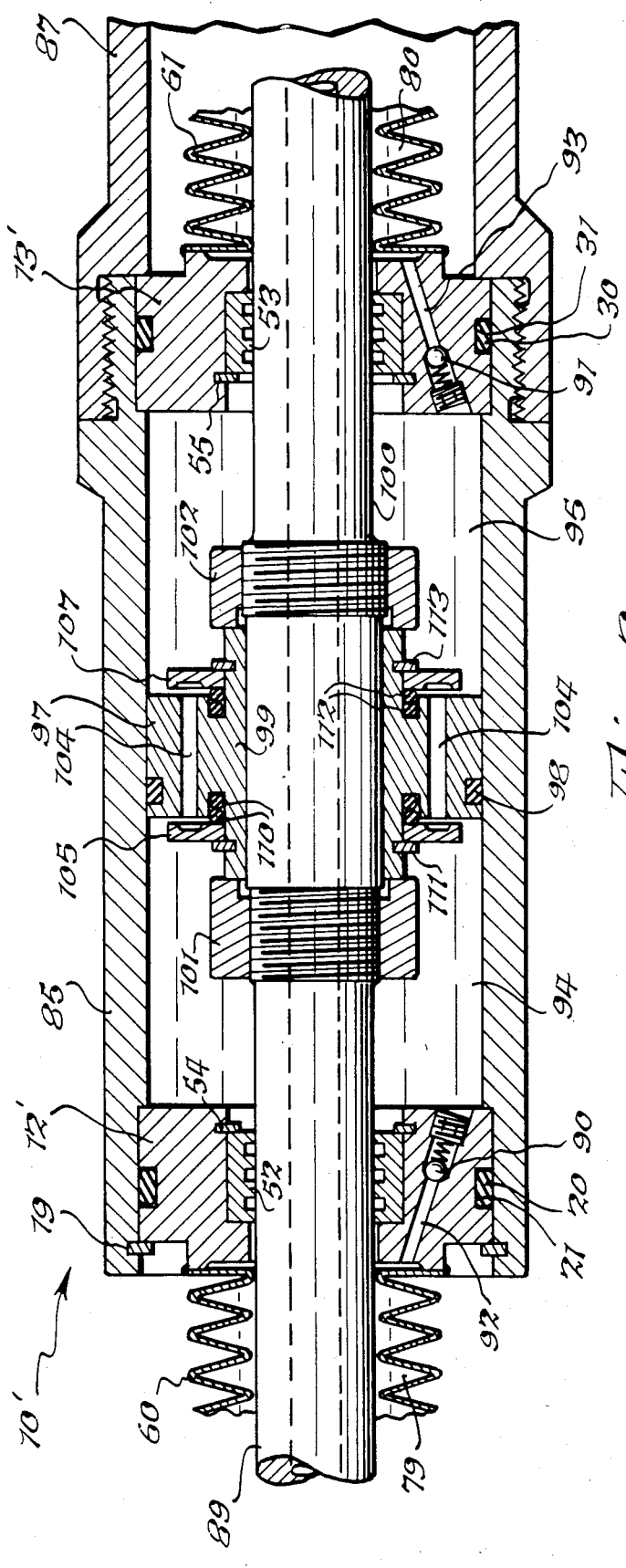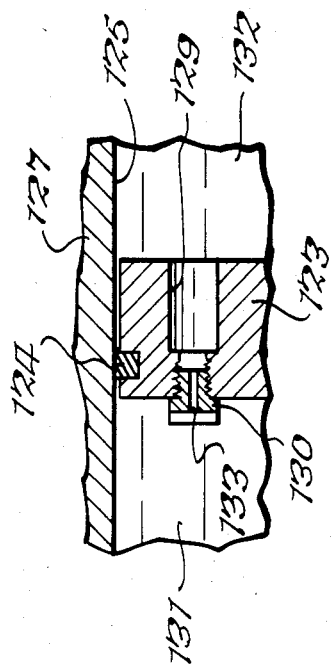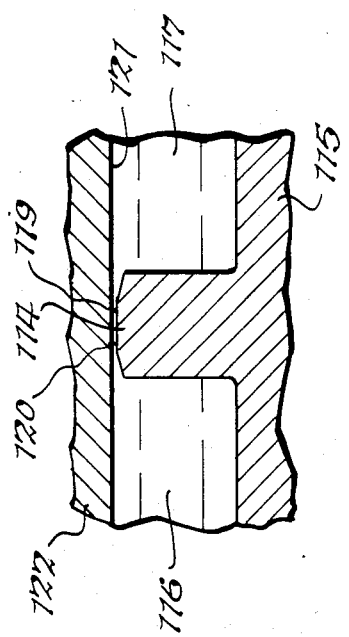

FRICTIONLESS HYDRAULIC DAMPER AND DAMPER-SNUBBER

BACKGROUND OF THE INVENTION

The present invention relates to a frictionless hydraulic damper and to a frictionless hydraulic damper which can also function as a snubber.

By way of background, frictionless hydraulic dampers are desired for certain applications to attenuate forces between relatively movable objects where the internal frictional resistance of the dampers is objectionable. There are certain hydraulic devices which function solely as dampers, and there are other hydraulic devices which function as dampers when they are subjected to forces at low velocities and also function as snubbers when they are subjected to forces at high velocities. By way of definition, a hydraulic snubber must always function as a damper when placed between relatively moving external members which move relative to each other below a predetermined velocity, and it functions as a snubber when the external members move relative to each other above the predetermined velocity.

By way of further background, and by way of specific example, in nuclear plants small pipes are suspended by hangers in the nature of snubbers which are subjected to forces within the 200 to 3,000 pound range. In the past it has been highly impractical to use hydraulic snubbers for this application for two reasons. Firstly, radiation affected the plastic or rubber seals and thus permitted them to leak. Secondly, seals create friction and where small pipes were suspended by snubbers which were subjected to forces between 200 and 500 pounds, the seal friction was a substantial portion of the applied forces which did not allow the small pipe to move in an unrestrained manner while being supported. Therefore, in the past hydraulic snubbers were not used for the foregoing applications, and instead highly complex mechanical snubbers were used. These required high maintenance and many times were unreliable because of their complexity.

SUMMARY OF THE INVENTION

It is accordingly the primary object of the present invention is to provide a frictionless hydraulic damper.

Another object of the present invention is to provide a frictionless hydraulic damper, which functions as a snubber when the damper experiences forces which cause the piston head therein to move above a predetermined velocity. Other objects and attendant advantages of the present invention will readily be perceived hereafter.

The present invention relates to a damper comprising a cylinder, end walls in said cylinder, a shaft, labyrinth seals in said end walls, portions of said shaft in said labyrinth seals, end portions of said shaft extending outwardly beyond said labyrinth seals, a bellows seal mounted in fluid-tight relationship between each of said end walls and its adjacent end portion of said shaft, fluid in said cylinder and in both of said bellows, a piston head on said shaft in said cylinder, orifice means located relative to said piston head to permit flow of said fluid past said piston head, conduit means effecting communication between both of said bellows seals, first means on said shaft for attachment to a first external object, and second means on said cylinder for attachment to a second external object which is movable relative to said first external object. The present invention also relates to a damper having the above structure which can function as a snubber when it includes valve means for selectively closing said orifice means when the piston head moves above a predetermined velocity.

The various aspects of the present invention will be more fully understood when the following portions of the specification are read in conjunction with the accompanying drawings wherein:

BRIEF DESCRIPTION OF THE DRAWINGS

FIG. 1 is a view, partially in cross section, of one embodiment of the improved frictionless damper of the present invention;

FIG. 2 is an enlarged fragmentary cross sectional view of a portion of the frictionless damper of FIG. 1;

FIG. 3 is an enlarged fragmentary cross sectional view of another embodiment of the present invention which is a damper with a snubbing valve;

FIG. 4 is a fragmentary cross sectional view showing a piston damper head which can comprise another embodiment of the present invention; and FIG. 5 is a fragmentary cross sectional view of a damper piston head which can comprise a still further embodiment of the present invention.

DESCRIPTION OF THE PREFERRED EMBODIMENTS

The frictionless damper 10 of FIGS. 1 and 2 comprises an annular cylinder 11 having cylindrical end walls 12 and 13 mounted therein. End wall 12 includes a side 14 which has its outer edge held in abutting relationship with annular shoulder 15 by split ring 17 which is suitably retained in groove 19. An O-ring seal 20 is located in groove 21 to provide sealing against leakage. The outer annular edge of face 22 of end wall 13 abuts shoulder 23 of cylinder 11, and the shoulder 24 of cylinder extension 25 bears against the outer edge of end wall face 27 to retain it in position. An O-ring 30 is located in groove 31 to provide sealing between end wall 13 and cylinder 11. Cylinder extension 25 is threaded onto cylinder 11 at 29, and it has an attachment member 26 at its outer end for attachment to an external object.

A shaft 32 has a central portion 36 which is located in the space between end wall faces 14 and 22 and it also includes outer end portions 33 and 34 which extend varying amounts through and beyond end walls 12 and 13, respectively, depending on the position of piston head 37 which is mounted on the central portion 36 of the shaft. Piston head 37 is mounted on sleeve 39 which is held in position by nuts 40 and 41 threadably secured to the shaft. A plurality of Bellville washers 42 bear against face 43 of piston 37, and valve member 44 bears against face 45 to normally close the plurality of circumferentially located bores 47. There is a clearance space 49 between the outer periphery 50 of piston head 37 and the inner surface 51 of cylinder 11. The clearance space 49 constitutes a fluidic damping orifice of the type disclosed in U.S. Pat. No. 3,722,640.

The outer end portions 33 and 34 of shaft 32 are supported for rectilinear sliding movement in labyrinth seals 52 and 53, respectively, suitably mounted in cavities in end walls 12 and 13, respectively, and retained therein by split rings 54 and 55, respectively. There is a slight clearance between shaft portions 33 and 34 and their labyrinth seals 52 and 53, respectively, to permit shaft 32 to float substantially frictionlessly therein, and thus there can be leakage of fluid from cylinder chambers 57 and 59 on opposite sides of piston head 37 through the seals. It will be appreciated that if O-ring seals or any other type of seals were used instead of the labyrinth seals 52 and 53 with their clearance, there would be a frictional drag on shaft 32 which could exceed approximately 2% of the rated load of the damper, and thus would be considered objectionable for many purposes.

In order to contain the above-mentioned leakage beyond labyrinth seals 52 and 53 within the cylinder 11, metal bellows seals 60 and 61 are mounted in fluid-tight relationship between end walls 12 and 13 and the portions of shaft ends 33 and 34 which extend outwardly beyond end walls 12 and 13. In this respect the annular end 62 of bellows seal 60 is secured, as by soldering or brazing, to annular lip 63 of end wall 12. The opposite annular end 64 of bellows 60 is attached as by soldering or brazing to ring 65 which is held on reduced end portion 67 of shaft 32 by attachment member 69 which connects shaft 32 to an external foreign object. The annular end portion 70 of bellows 61 is suitably attached to annular rim 71 of end wall 13 by soldering or brazing, and the opposite end 72 of bellows 61 is attached to annular member 73 by soldering or brazing. A nut 74 retains member 73 in position. The inner accordian edges 75 and 77 of bellows 60 and 61, respectively, are in substantially touching relationship with shaft portions 33 and 34, respectively, so that the bellows will remain centered relative to the shaft, that is, they will not distort as they are expanded and compressed with movement of shaft 32.

Hydraulic fluid fills the space in cylinder 11 between end walls 12 and 13 including cylinder chambers 57 and 59 on opposite sides of piston 37. Cylinder chamber 57 is in communication with bellows chamber 79 because of the leakage permitted by bellows seal 52. Cylinder chamber 59 is in communication with bellows chamber 80 because of the leakage permitted by labyrinth seal 53. Chambers 79 and 80 are also filled with hydraulic fluid, and thus there is a continuous body of hydraulic fluid within chambers 57, 59, 79 and 80 and labyrinth seals 52 and 53. In order to permit communication between bellows chambers 79 and 80, a bore 81 is provided within shaft 32. Cross ports 82 and 83 are in communication with bore 81 and are also in communication with bellows chambers 79 and 80, respectively. Normally if piston head 37 is moving below a predetermined speed, there will be a low damping force caused by flow of hydraulic fluid between cylinder chambers 57 and 59 through the orifice or clearance 49 and the leakage induced by said low damping force past labyrinth seals 52 and 53 would be practically non-existent, and there will be a flow of fluid between bellows chambers 79 and 80. More specifically, as either bellows 60 or 61 expands, the other will contract and thus fluid will be forced into the expanding bellows by the contracting bellows through the conduits 81, 82 and 83. However, if piston head 37 should move in either direction at a velocity such that substantial damping pressures exist, there may be leakage through the labyrinth seal located in the cylinder chamber which is experiencing high pressure, and this leakage will be compensated for by the communication between bellows chambers 79 and 80. More specifically, additional fluid passing through the seal into one bellows chamber 79 or 80 will pass through conduits 81, 82 and 83 to the other bellows chamber. At this time there will be extremely low pressure in the other cylinder chamber, and this will tend to draw fluid into it from the adjacent bellows chamber. When the damper is in a low pressure condition, and when piston head 37 is moving at a low speed, the pressure in chambers 57, 59, 80 and 81 will be substantially equal. However, when there is a substantial increase in fluid pressure in either cylinder chamber 57 or 59 due to piston head movement at high speed, the pressures in bellows chambers 80 and 81 will still be at substantially the same low value as when the piston head was moving at low speed because of the throttling effect of the labyrinth seal through which leakage occurs. The maintaining of the low pressures in the bellows obviates their distortion and possible fracture which would otherwise occur if they were subjected to high pressures.

The specific valve 44, as shown in FIG. 2, functions in the following manner. If movement of piston head 37 to the left should exceed a predetermined velocity so that there was a pressure force on piston face 45 which was greater than the force exerted on piston face 43 by Bellville washers 42, piston head 37 will move to the right on sleeve 39 to thereby open ports 47 to permit communication therethrough between cylinder chamber 57 and cylinder chamber 59. Bellville washers 42 will return piston head 37 to the position shown in FIG. 2 wherein valve 44 closes ports 47 after the total force on piston face 45 has been reduced to a value which is lower than the spring force of the Bellville washers 42. However, there is no pressure relief if piston 37 moves to the right because there can be no unseating of valve 44 relative to bores 47. It is to be understood that valve 44 will open only when the device functions as a damper in an overload condition when the pressure in cylinder chamber 57 exceeds a predetermined value.

In FIG. 3 a modified embodiment of the present invention is shown which is a damper-snubber in that it functions as a damper under certain conditions and functions as a snubber under other conditions. An annular cylinder 85 may be identical to annular cylinder 11 and may have a cylinder extension 87 which is identical to cylinder extension 25. It will be appreciated that an attachment member, such as 69 of FIG. 1, is mounted on the end of shaft 89. End walls 12' and 13' are analogous to end walls 12 and 13 of FIG. 1 and they contain identical elements of structure which are denoted by the identical numerals used in FIGS. 1 and 2. In addition, bellows 60 and 61 are identical to those described above relative to FIGS. 1 and 2 and further are attached to the end walls and other structure in the same manner as described above relative to FIGS. 1 and 2. However, end walls 12' and 13' differ from end walls 12 and 13, respectively, in that they contain spring biased check valves 90 and 91, respectively, which are located at the ends of conduits 92 and 93, respectively, so that under select conditions there may be communication through these conduits between each bellows chamber and its adjacent cylinder chamber. More specifically, conduit 92 and check valve 90 may permit flow from bellows chamber 79 into cylinder chamber 94. Also, conduit 93 and check valve 91 may permit flow from bellows chamber 80 into cylinder chamber 95.

A piston head 97 includes a central portion 99 which is mounted on central portion 100 of shaft 89. A low friction seal 98 is mounted on piston head 97. This seal 98 may be of the type which acts to provide sealing only when it is subjected to high fluid pressure in either of the cylinder chambers. Alternatively, seal 98 may be of the type which merely does not produce much friction, or it might be a frictionless labyrinth seal of the type shown at 52 and 53. The outer end portions of shaft 89 are supported in a frictionless manner in labyrinth seals 52 and 53 as described above relative to FIGS. 1 and 2. Nuts 101 and 102 are threaded onto the central portion 100 of shaft 89 and secure piston head 97 in position. A plurality of circumferentially placed bores 104 are located in piston head 97. Annular valve members 105 and 107 are slidably mounted on central portion 99 of piston head 97. O-rings 110 normally bias valve member away from bores 104 and against split ring 111. O-rings 112 normally bias valve member 107 away from bores 104 and against split ring 113. Alternate means, such as coil springs or equivalent structure, can be substituted for O-rings 110 and 112.

During normal movement of piston head 97 to the right or left below a predetermined velocity, there can be flow between cylinder chambers 94 and 95 through bores 104, and there should be no significant leakage through the labyrinth seals to the bellows chambers. The flow of fluid through bores 104 will create a damping action. If for any reason the velocity of piston head 97 should exceed a predetermined value, either valve 105 or 107 will block off bores 104 and thus the damper will act as a snubber because fluid will be prevented from flowing through bores 104. For example, if the velocity of piston head 97 should exceed a predetermined value as piston head 97 is moving to the right, valve member 107 will move to the left against the bias of O-rings 112 and thus close bores 104 to cause the damper to function as a snubber. Conversely, if the velocity of the piston head to the left should exceed the predetermined value, the fluid pressure will cause valve member 105 to compress O-rings 110 and move to a position wherein it closes bores 104 to thus prevent hydraulic fluid from moving from chamber 94 to chamber 95 and thus cause the damper 10' to act as a snubber. As explained above relative to FIGS. 1 and 2, any leakage of fluid past seals 52' and 53' will enter bellows chambers 79 or 80, respectively, and since there is communication between the bellows chambers 79 and 80 through shaft bore 81 and cross bores, such as 82 and 83 (not shown in FIG. 3), the flow will be equalized.

However, there are certain situations where piston head 97 may oscillate back and forth with the valve member 105 or 107 closing bores 104. This oscillation may result in a pumping action wherein fluid may be pumped from cylinder chamber 94 into bellows chamber 79 past seal 52 as piston head 97 moves to the left, but as the piston head 97 moves to the right during its oscillation, there will not be enough pressure in bellows chamber 79 to force the liquid back into cylinder 94. Accordingly, as piston head 97 moves to the right, it will tend to draw a vacuum in cylinder chamber 94, or at least cause the pressure therein to be less than the pressure in bellows 79. At this time check valve 90 will open to permit flow from bellows chamber 79 into cylinder chamber 94. The same action occurs when piston head 97 oscillates slightly while moving to the right above a predetermined velocity so that the high pressure generated in chamber 95 forces liquid from cylinder chamber 95 into bellows chamber 80 during its movement to the right. However, as it moves to the left during its oscillations, the pressure in cylinder chamber 95 will fall below the pressure in bellows chamber 80 and thus check valve 91 will open to permit flow from bellows chamber 80 into cylinder chamber 95.

In FIG. 4 a further modified embodiment of the present invention is shown wherein the piston head 114 is an integral part of shaft 115, which otherwise has all of the above conduits and structure for mounting it relative to end walls, such as 12 and 13. The damping action in the embodiment of FIG. 4 is obtained in a similar manner as discussed above relative to FIGS. 1 and 2 wherein there is a flow between cylinder chambers 116 and 117, which are analogous to cylinder chambers 57 and 59, respectively, of FIG. 4, through clearance space or annular orifice 119 between the outer periphery 120 of piston head 114 and the internal surface 121 of cylinder 122. Again, except for the construction of piston head 114, the embodiment of FIG. 4 may be identical in all other respects to the structure described above in detail in FIGS. 1 and 2 or FIG. 3.

In FIG. 5 a still further further embodiment of the present invention is disclosed wherein the only difference between this embodiment and the embodiments of FIGS. 1 and 2 or FIG. 3 resides in the configuration of the piston head 123 which has a low friction seal 124 therein, as described above relative to seal 97 of FIG. 3, which provides sealing engagement with the inner surface 125 of cylinder 127. A bore 129 is provided in piston head 123 which receives a plug 130 to permit flow between cylinder chamber 131 and 132 as piston head 123 moves. The plug 130 has a bore 133 of a predetermined size through which liquid flows. By using plugs with different sized bores, the damping characteristics provided by piston head 123 may be varied.

While the fluid discussed above was hydraulic fluid, it will be appreciated that the damper and damper-snubber can also operate with a suitable gaseous fluid.

While preferred embodiments of the present invention have been disclosed, it will be understood that the present invention is not limited thereto but may be otherwise embodied within the scope of the following claims.

What is claimed is:

1. A damper comprising a cylinder, first and second opposite end walls in said cylinder, an elongated shaft having a central portion between said first and second end walls, first and second outer end portions on said shaft on opposite sides of said central portion, said first and second outer end portions extending through said first and second end walls, respectively, a piston head mounted on said central portion of said shaft and dividing the space in said cylinder between said first and second end walls into a first cylinder chamber proximate said first end wall and a second cylinder chamber proximate said second end wall, fluid in said first and second cylinder chambers, orifice means operatively associated with said piston head for permitting flow of fluid past said piston head between said first and second cylinder chambers during movement of said piston head, first and second labyrinth seals in said first and second end walls, respectively, for mounting said first and second outer end portions of said shaft, respectively, for sliding movement, first and second fluid-tight bellows mounted in sealed relationship between said first and second outer end portions of said shaft, respectively, and said first and second end walls, respectively, on the opposite sides of said first and second end walls from said first and second cylinder chambers, respectively, for providing first and second bellows chambers, respectively, fluid in said first and second bellows chambers, first attachment means on said cylinder proximate said first bellows for attaching said cylinder to a first external object, second attachment means on said second end portion of said shaft for attaching said shaft to a second external object which is movable relative to said first external object, and conduit means interconnecting said first and second bellows chambers to permit communication therebetween.

2. A damper as set forth in claim 1 wherein said conduit means comprise bore means in said shaft.

3. A damper as set forth in claim 2 wherein said bore means comprises a first bore extending longitudinally of said shaft, a second bore extending transversely to said first bore and in communiation with both said first bore and said first bellows chamber, and a third bore extending transversely to said first bore and in communication with both said first bore and said second bellows chamber.

4. A damper as set forth in claim 1 wherein said piston head includes valve means for selectively reducing flow through said orifice means when said piston head experiences a velocity above a predetermined value to thereby cause said damper to function as a snubber.

5. A damper as set forth in claim 4 wherein said orifice means comprises second bore means in said piston head, and wherein said valve means comprises a valve member, and means for movably mounting said valve member relative to said piston head.

6. A damper as set forth in claim 4 wherein said orifice means comprises second bore means in said piston head, and wherein said valve means comprises first and second valve members, and means for movably mounting said first and second valve members on opposite sides of said piston head to selectively close said second bore means in both directions of movement of said piston head.

7. A damper as set forth in claim 1 wherein said orifice means comprises a clearance space between said piston head and said cylinder.

8. A damper as set forth in claim 7 including second bore means in said piston head, and valve means for selectively opening said second bore means when the velocity of said piston head exceeds a predetermined value.

9. A damper as set forth in claim 1 including check valve means in said first end wall for permitting flow from said first bellows chamber to said first cylinder chamber when the pressure in said first bellows chamber exceeds the pressure in said first cylinder chamber by a predetermined amount.

10. A damper as set forth in claim 1 including check valve means in said second end wall for permitting flow from said second bellows chamber to said second cylinder chamber when the pressure in said second bellows chamber exceeds the pressure in said second cylinder chamber by a predetermined amount.

11. A damper as set forth in claim 10 including check valve means in said first end wall for permitting flow from said first bellows chamber to said first cylinder chamber when the pressure in said first bellows chamber exceeds the pressure in said first cylinder chamber by a predetermined amount.

12. A damper-snubber comprising a cylinder, end walls in said cylinder, a shaft, labyrinth seals in said end walls, portions of said shaft in said labyrinth seals, end portions of said shaft extending outwardly beyond said labyrinth seals, a bellows seal mounted in fluid-tight relationship between each of said end walls and its adjacent end portion of said shaft, fluid in said cylinder and in both of said bellows, a piston head on said shaft in said cylinder, orifice means located relative to said piston head to permit flow of fluid past said piston head when said piston head moves below a predetermined velocity to thereby cause said damper-snubber to function as a damper, conduit means effecting communication between both of said bellows seals, first means on said shaft for attachment to a first external object, second means on said cylinder for attachment to a second external object which is movable relative to said first external object, and valve means for selectively closing said orifice means when said piston head moves above said predetermined velocity to cause said damper-snubber to function as a snubber.

13. A damper-snubber as set forth in claim 12 wherein said conduit means comprises bore means in said shaft.

* * * * *